Jan. 11, 1949.  C. GIACOMELLI  2,458,775
WATER SKI
Filed Feb. 14, 1945  2 Sheets-Sheet 2
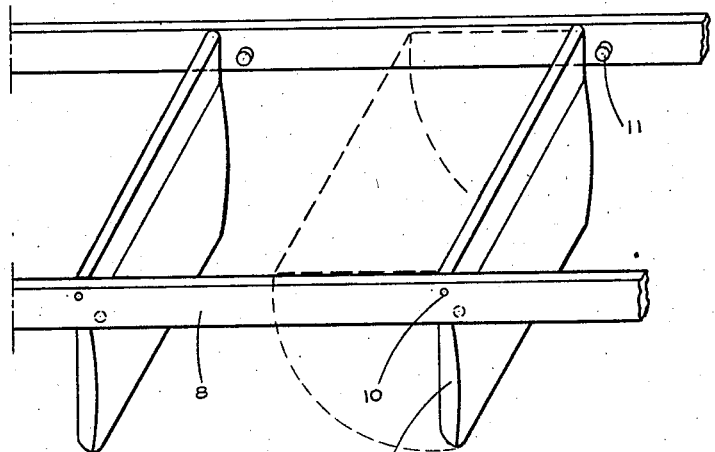
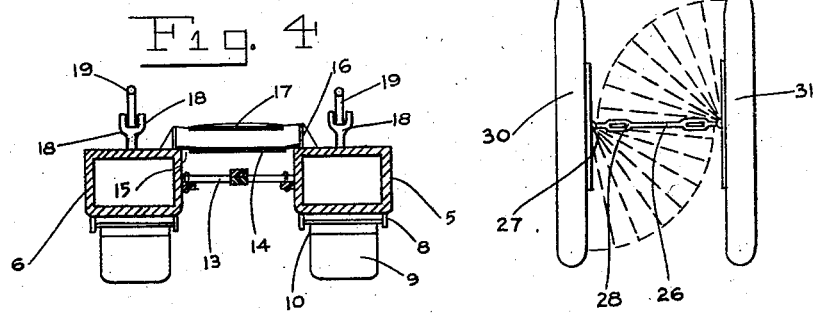
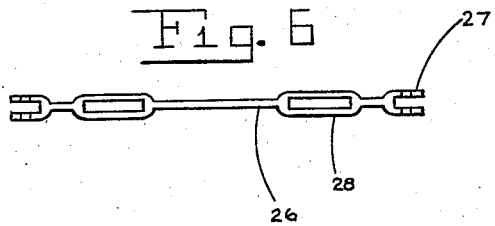
Inventor
CARLO GIACOMELLI Patented Jan. 11, 1949

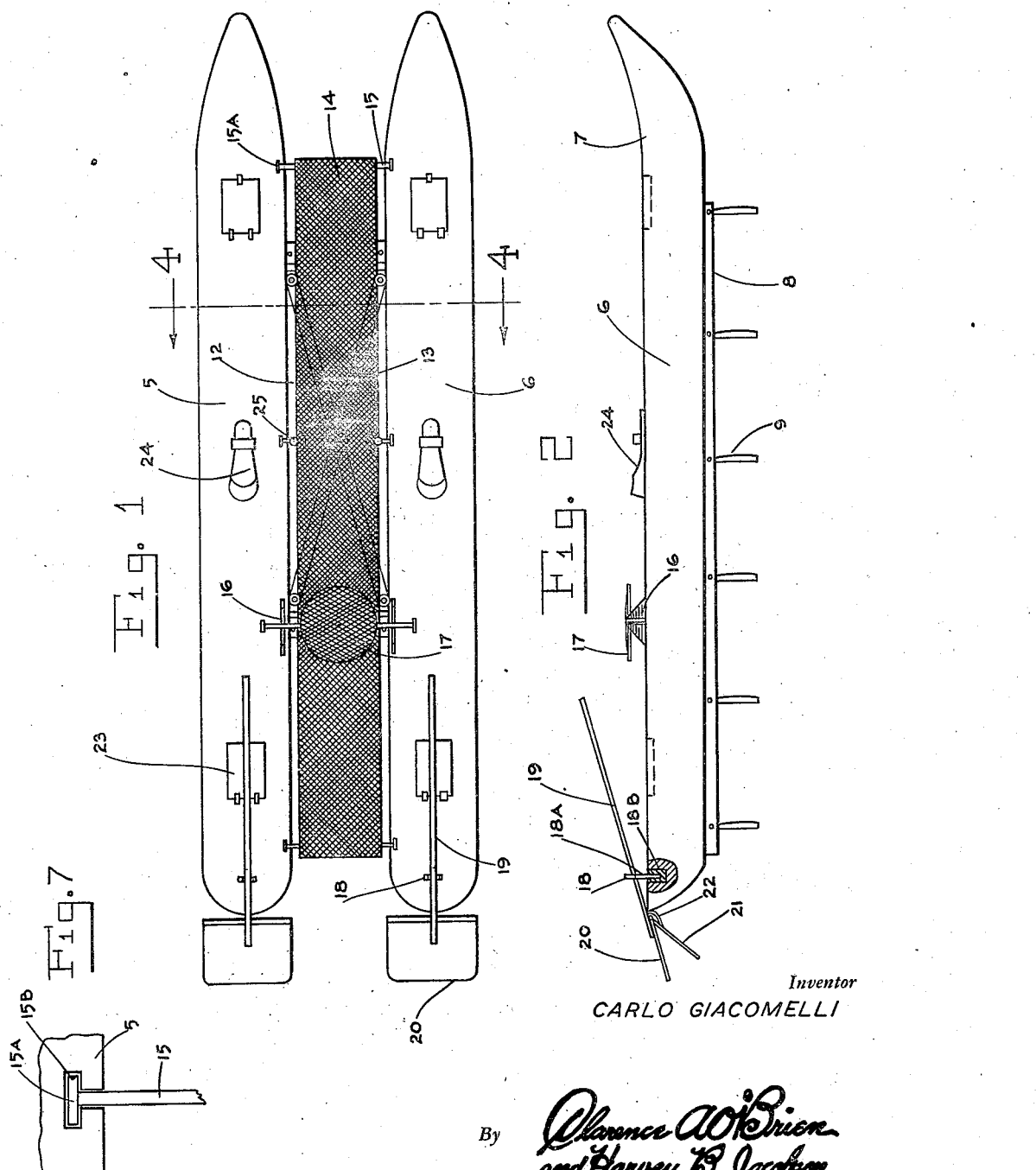

2,458,775

UNITED STATES PATENT OFFICE 2,458,775

WATER SKI

Carlo Giacomelli, New York, N. Y.

Application February 14, 1945, Serial No. 577,784

1 Claim. (Cl. 115—32)

The present invention relates to new and useful improvements in water skis embodying elongated floats or pontoons adapted for attaching to the feet of a person and embodying means for moving the skis forwardly over the surface of the water.

An important object of the present invention is to provide a pair of elongated floats or pontoons adapted for use as water skis and also embodying means for rigidly connecting the floats together in spaced parallel relation and adapted for supporting a person in either a sitting or a prone position.

A further object of the invention is to provide novel means at the stern of the float for propelling the same forwardly.

A still further object is to provide a device of this character of simple and practical construction, which is efficient and dependable in use, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which—

Figure 1 is a top plan view.

Figure 2 is a side elevational view.

Figure 3 is an enlarged fragmentary perspective view showing the attaching means for the blades on the bottom of the float.

Figure 4 is a transverse sectional view taken substantially on a line 4—4 of Figure 1.

Figure 5 is a top plan view illustrating a modified form of connector for the float for use by a swimmer, Figure 6 is an enlarged top plan view of the connector, and Figure 7 is a detail of one of the connectors for the mat.

Referring now to the drawings in detail and first with respect to the form of invention illustrated in Figures 1 to 4, inclusive, the numerals 5 and 6 designate a pair of elongated floats or pontoons having upwardly inclined bow portions 7.

To the bottom of each of the floats is suitably secured a pair of longitudinally extending spaced parallel strips 8 having a plurality of blades 9 pivoted therebetween by means of trunnions 10 projecting outwardly from the side edges of the blade adjacent the upper edge thereof, the blades being constructed of non-buoyant material so that the same will be supported in a perpendicular position between the strips 8 and projecting downwardly from the bottom of the float, the blades being freely swingable on the trunnions 10.

Stop pins 11 project from the opposed sides of the strips 8 to limit the forward swinging movement of the blades.

To the inner sides of the floats 5 and 6 are also attached strips 12 and to which inclined spacing members 13 are attached, the spacing members being crossed at the central portion thereof and connected at their front ends to one of the strips 12 and at their opposite ends to the other of said strips as shown to advantage in Figure 1 of the drawings, the spacing members 13 thus securing the floats 5 and 6 in spaced parallel relation.

A flexible woven strip of material 14, such as netting or the like, is secured at its side edges between the floats 5 and 6 by attaching rods 15 at the front and rear ends of the netting and having heads 15a received in T-slots 15b in the edges of the floats, the netting being adapted to support a person in a prone position.

Upstanding brackets or legs 16 are secured to the top or deck portion of the floats 5 and 6 adjacent the stern thereof and on which a seat 17 is supported.

Also rising from the deck of each float, adjacent the stern thereof, is a guide yoke 18 having a stem 18a rotatably mounted in a socket 18b, the yoke having a handle 19 slidably and swivelly positioned therein, the handle 19 extending longitudinally above the float and having a paddle 20 fixedly attached at the rear end thereof and projecting over the stern of the float.

To the front edge of the paddle 20 is hingedly attached a blade 21 underlying the paddle, the blade 21 being limited in its forward movement by means of a stop 22 secured to the under side of the handle 19.

By sliding the handle 19 rearwardly the blade 21 will be moved downwardly into the position as shown in Figure 2 of the drawings and the blades will then function to push the float forwardly.

By rotating the handle 19 in its yoke 18 so as to position the paddle 20 vertically the same may then be used as a rudder.

The floats 5 and 6 are preferably of hollow construction and are provided with hinged doors 23 adjacent the front and rear portions thereof in the deck of the float to afford access to the interior thereof and by means of which various equipment may be stored in the float.

The spacing members 13 may be detached from the float and the netting 14 and seat 17 are also removed therefrom and the floats 5 and 6 then used as water skis by inserting the feet of a person in strap equipped foot sockets with toe ends pointing forwardly 24. When the floats are used as water skis the same may be alternately moved forwardly in a walking action, the blades 9 swinging rearwardly under the floats during the forward movement thereof and being held against the stop pins 11 to retard rearward movement of the floats while one of the floats is moved forwardly.

The strips 12 on the inside of the floats are also provided with sockets 25 to which a cross member 26 may be pivotally attached by means of yokes 27. The cross member 26 is formed with hand grip slots 28 adapted for engagement by the hands of a swimmer so that the floats 30 and 31 as shown in Figure 5 of the drawings may alternately be moved forwardly.

It is believed that the details of construction and manner of use of the device will be readily understood from the foregoing without further detailed explanation.

Having thus described the invention, what I claim is:

In a water craft, a float having a stern, a yoke comprising a stem upstanding from said stern and rotatable therein, and an elongated handle having a rear end overhanging said stern, said handle being laterally swingable about the axis of rotation of the stem and endwise slidable forwardly and rearwardly and rotatable about its longitudinal axis, a paddle extending from the rear end of the handle parallel therewith for rotation by said handle into vertical position and use as a rudder by swinging of the handle, and a blade pivoted to the rear end of said paddle to incline downwardly and rearwardly therefrom for use as a pusher in the water by endwise sliding of the handle rearwardly, said blade being swingable on its pivot upwardly by pressure of the water when the handle is slid forwardly and to obviate resistance to sliding of said handle forwardly.

CARLO GIACOMELLI.

REFERENCES CITED

The following references are of record in the file of this patent:

UNITED STATES PATENTS

| Number | Name | Date |
|---|---|---|
| 14,973 | Ross | May 27, 1856 |
| 22,175 | Furbush | Nov. 30, 1858 |
| 451,731 | Gillespie | May 5, 1891 |
| 849,533 | Dziedzic | Apr. 9, 1907 |
| 1,232,751 | Auer | July 10, 1917 |
| 1,288,689 | Sampere | Dec. 24, 1918 |
| 1,728,056 | Graffeo | Sept. 10, 1929 |
| 2,139,022 | Johnson | Dec. 6, 1938 |

FOREIGN PATENTS

| Number | Country | Date |
|---|---|---|
| 369,228 | France | Jan. 5, 1907 |